United States Patent [19]

Anju

[11] Patent Number: 4,963,097
[45] Date of Patent: Oct. 16, 1990

[54] DISPLAY APPARATUS FOR A GROUP EDUCATION SYSTEM

[75] Inventor: Shinji Anju, Saitama, Japan

[73] Assignee: Sony Corporation, Tokyo, Japan

[21] Appl. No.: 869,449

[22] Filed: Apr. 27, 1986

Related U.S. Application Data

[63] Continuation of Ser. No. 631,810, Jul. 17, 1984, abandoned.

[30] Foreign Application Priority Data

Jul. 25, 1983 [JP] Japan .................................. 58-136549

[51] Int. Cl.⁵ ........................ G09B 29/00; G09G 3/02
[52] U.S. Cl. .................................... 434/431; 434/336; 340/712
[58] Field of Search ................ 434/431, 336; 340/709, 340/712

[56] References Cited

U.S. PATENT DOCUMENTS

| | | | |
|---|---|---|---|
| 598,384 | 2/1898 | McClung | 434/431 |
| 2,984,016 | 5/1961 | Nagle | 434/431 |
| 3,560,675 | 2/1971 | Krakinowski | 340/712 |
| 3,614,322 | 9/1971 | Joslow et al. | |
| 3,691,528 | 4/1972 | Calvagna et al. | |
| 4,004,354 | 1/1977 | Yamauchi | 434/336 |
| 4,417,239 | 11/1983 | Demke et al. | 340/709 |
| 4,427,861 | 1/1984 | Stillie | 340/365 VL |
| 4,451,895 | 5/1984 | Sliwkowski | 340/712 |
| 4,484,179 | 11/1984 | Kasday | 340/712 |

FOREIGN PATENT DOCUMENTS 1479379 5/1975 United Kingdom .

Primary Examiner—Edward M. Coven
Assistant Examiner—Jessica J. Harrison
Attorney, Agent, or Firm—Lewis H. Eslinger; Donald S. Dowden

[57] ABSTRACT

In a group education system of the type having a teacher console and a plurality of terminals at seat positions assignable for student use, a display apparatus includes a display screen adapted to display a seating pattern which corresponds to the seating arrangement of terminals within the classroom. The displayed pattern is created by designating certain areas of the display screen to correspond to seat positions actually assigned for student use, and identifying symbols may be displayed in each of these areas. The display apparatus also includes pattern selecting keys for reordering the designated areas to correspond to a selected on of a plurality of predetermined patterns. In an information display made of the apparatus, actuation of a switch corresponding to a respective one of these areas causes the display of information related to the student occupying the corresponding seat in the classroom.

16 Claims, 5 Drawing Sheets

DISPLAY APPARATUS FOR A GROUP EDUCATION SYSTEM

This is a continuation of application Ser. No. 06/631,810, filed July 17, 1984 now abandoned.

BACKGROUND OF THE INVENTION

1. Field of the Invention

The present invention relates generally to display apparatus, and more particularly is directed to a display apparatus suitable for use with a group education system, such as a group language system or a group musical instrument exercising system, and the like.

2. Description of the Prior Art

With the development of interactive computer teaching systems, there are now available group education systems where each student is seated at a terminal and the teacher is seated at a console which receives information from the student terminals and transmits information thereto. For instance, a student in need of assistance may transmit a signal from his terminal to the console. Alternatively, the students may receive questions transmitted from the console to the terminals individually or as a group, and may then send back answers to the console. In order to effectively monitor the student activity, it has been proposed to have a display apparatus at the console with a display screen on which may be displayed information about the students. Such information may concern questions and answers communicated between the teacher and the students, a listing of teaching materials, student attendance, monitoring of the students' progress during the education session, and so forth.

One particularly advantageous and useful display of information would be a display corresponding to the seating arrangement of the students. If the classroom were viewed from above, the terminals would appear as a pattern of seats. A display of seat images in this pattern would provide the teacher with an orderly and complete view of the classroom as it is being used. In this regard, it is highly desirable that the pattern of seat images on the display screen correspond closely to the actual pattern of seats, or terminals, as occupied by the students at any particular time. If then, for example, the teacher wishes to confirm the attendance of all the students in his class, he may signal each student to transmit a return signal from his terminal. The return signal would create an indication in the respective seat image on the screen. If one of the seat images did not carry this indication, then the teacher would know the student is absent.

However, the arrangement of seats or terminals is frequently changed in accordance with the size of the classroom, the number of students, the particular students attending on a particular day, or the content of the lesson. In such a case, if the seat images on the screen have been permanently assigned in one particular pattern, they will very likely not correspond to the actual terminal positions in the classroom. It is therefore highly desirable that not only should a variety of patterns of seat images be available to correspond with any practical seating arrangement in the classroom, but also that only the seats actually occupied have a corresponding seat image on the display screen.

In a previously proposed group education system, the seat images on the screen could be selected by either actuating a display switch or by mounting a display lamp in a particular position to make the pattern of seat images on the display screen correspond to the actual seating arrangement in the classroom. However, this seat selection operation is quite complicated and cannot be performed without difficulty.

OBJECTS AND SUMMARY OF THE INVENTION

Accordingly, it is an object of this invention to provide an improved display apparatus for use with a group education system which avoids the foregoing problems of the prior art.

More specifically, it is an object of this invention to provide a display apparatus for use with a group education system which is adapted to display on a display screen thereof a pattern of seat images corresponding to actual seat arrangements within the classroom.

A further object of this invention is to provide a display apparatus, as aforesaid, wherein the seat images for display on the display screen may be selected for display by a simple operation within a short period of time.

It is a further object of this invention to provide a display apparatus for use with a group education system which may be readily applied to a group language exercising system, a group musical instrument exercising system, and the like.

Another object of the present invention is to provide a display apparatus for use with a group education system where the physical position of the image area of each seat on the display screen corresponds to the physical position of the seat within the classroom.

Another object of this invention is to provide a display apparatus for use with a group education system for the case where the arrangement of seats within the classroom may be variously changed in accordance with the size of the classroom, the number of students, or the like, and wherein data associated with each seat may be displayed on the display screen in the image area corresponding to the position of the seat in each arrangement.

A still further object of this invention is to provide a display apparatus for use with a group education system, where the correspondance of the image areas with the actual seats may be rearranged in accordance with a plurality of predetermined patterns to provide fast and easy rearrangement of the displayed seat images when the seats are rearranged.

A yet further object of the present invention is to provide a display apparatus for use with a group education system which may be mass produced.

In accordance with an aspect of this invention, a display apparatus for a group education system having a plurality of seat positions assignable for student use comprises a display screen having a portion divided into a plurality of designatable image areas, selection means for selecting said designatable image areas one at a time and displaying a visually identifiable indicator in the selected one of the designatable image areas, means for designating the one selected image area as an image area assigned for student use to correspond to one of the seat positions, means for identifying each designated image area by associating therewith a selected one of a plurality of identifying marks, storage means for storing position data corresponding to the designated image areas and the identifying marks respectively associated therewith, and means for causing the display screen to selectively display, in the designated image areas, the identifying marks associated therewith in response to the stored position data.

The above, and other objects, advantages and features of the present invention, will become readily apparent from the following detailed description which is to be read in connection with the accompanying drawings forming a part hereof, and throughout which like reference numerals designate like elements.

BRIEF DESCRIPTION OF THE DRAWINGS

FIGS. 1A to 1D are illustrative diagrams showing examples of seating arrangements of terminals in a classroom, as seen from above;

FIG. 4 is a plan view of the display screen as used in the present invention, where the display screen is in a seat management mode for designating particular image areas to correspond to terminals assigned for student use;

DETAILED DESCRIPTION OF THE PREFERRED EMBODIMENT

Figure 2:
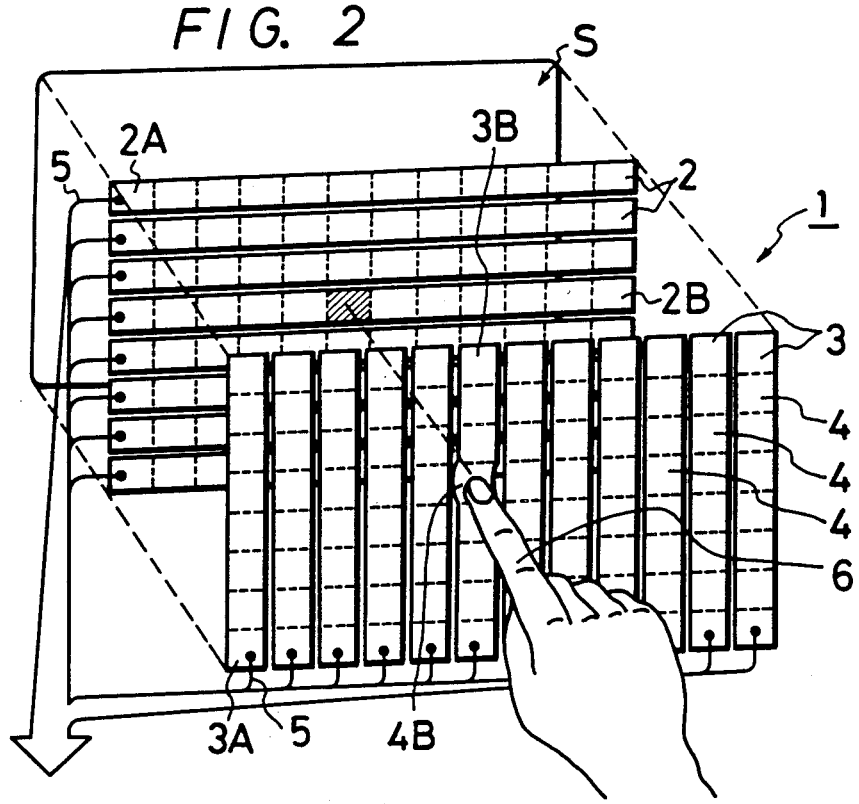
FIG. 2 is a schematic view of a display screen for use in the apparatus of the present invention.

A display apparatus for use with a group education system according to a preferred embodiment of the present invention will now be described in detail with reference to the drawings. In this description, the display apparatus embodying the present invention frequently will be described as if used with a group language class, but it will of course be understood that this display apparatus may be used in connection with any type of group education system where the students are assigned terminals interactively connected with a teacher console.

Figures 1A, 1B, 1C, 1D:
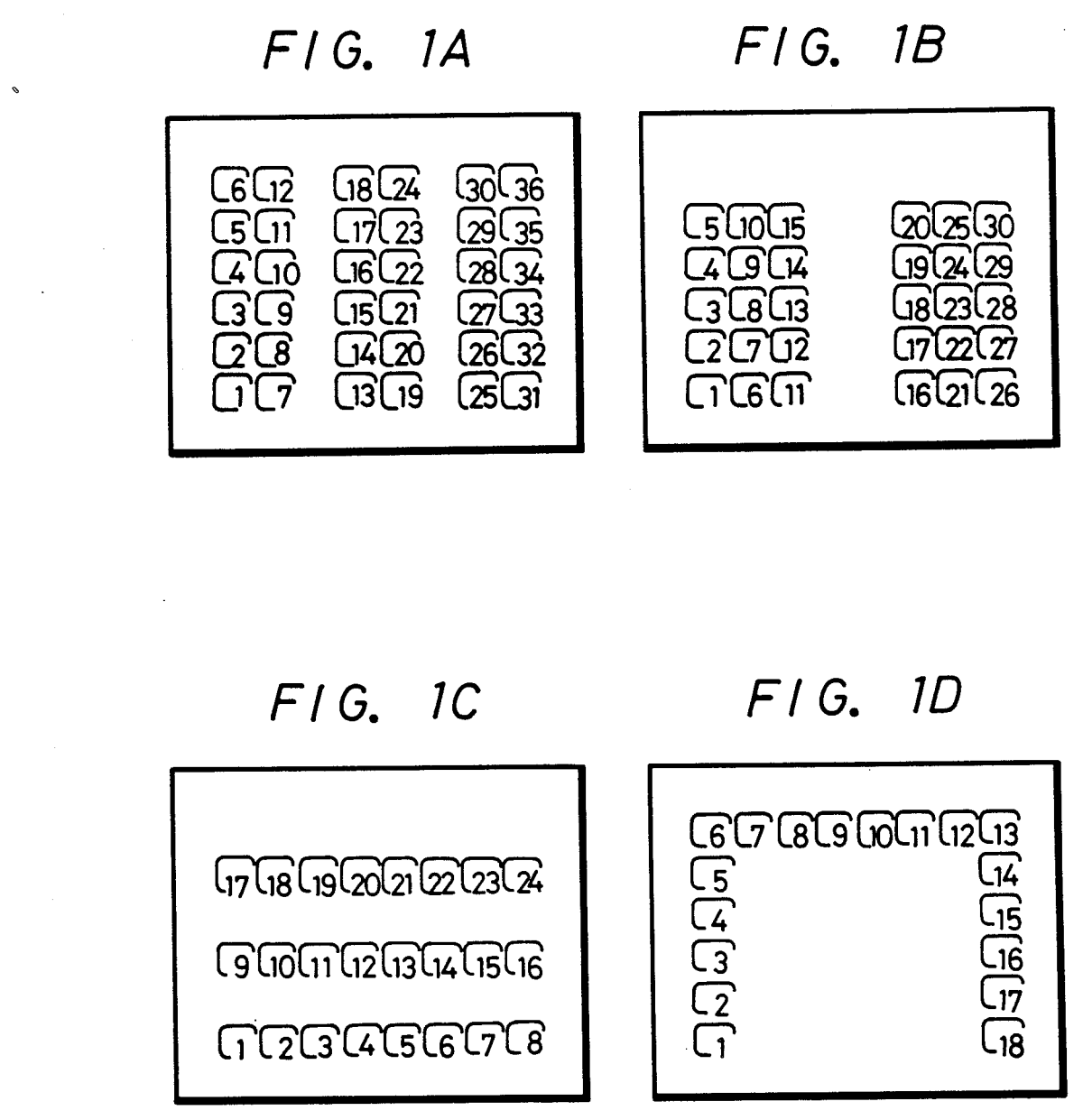

Referring now to FIGS. 1A through 1D, there are schematically illustrated four different seating arrangements in a classroom as viewed from above. The particular seating arrangement used in a class will depend, for example, on the number of students, the size of the classroom, or the particular subject then being taught. For instance, if a foreign language is being taught where the students will be working individually, arrangements such as those shown in FIGS. 1A through 1C may be appropriate. Alternatively, if the students will be engaged in conversation, or if, as in a musical instrument exercising class, the students should be able to observe one another, an arrangement such as that shown in FIG. 1D may be appropriate. Whatever the particular choice of seating arrangement, the pattern of seat images on the display screen should correspond to this actual seating arrangement, so that the teacher may make an easy and ready correspondence between the image on the display screen and the location of the students.

It may therefore be seen that it is highly desirable to provide a display apparatus for such a group education system where the screen can display seat images according to any one of these patterns, and may easily be operated to change from one pattern of seat images to another. The display apparatus embodying the present invention provides these highly advantageous features and advantageously includes a microcomputer and a display screen within the console used by the teacher. The microcomputer is adapted to store a variety of information about the students, such as the teaching material assigned, the particular material assigned for each day, the attendance of each student, and so forth. It is intended that, once the pattern of seat images on the screen has been designated to correspond to the particular seating arrangement in the classroom, information relating to each student and previously stored in the microcomputer may be read out and displayed on the screen in response to the actuation of an appropriate switch. Each of the seats can be associated with a selected image area on the display screen, advantageously the one having a physical position within the pattern on the display screen corresponding to the physical position of the seat in the classroom. Further associated with each image area will be an identifying symbol identifying the particular student occupying the corresponding seat. The identifying symbol may be, for example, the student's initials, or it may identify the student's function in the class, for example "FV" for "first violin" in a musical instrument exercising class.

Thus, in FIGS. 1A to 1D, the numbers appearing in the seat areas provide a numbering of the students according to the illustrated patterns, and these numbers may alternatively also be viewed as identifying symbols for the students. Thus, in FIG. 1A, Student No. 18 is seated in row 1 column 3, but in FIG. 1B he is seated in row 4 column 4. Information relating to Student No. 18, e.g. his attendance, the material assigned to him, his progress in the class, etc. may be stored in the microcomputer and displayed on the display screen in response to the actuation of a switch identified with Student No. 18. The actuation of the switch, of course, occurs after the seat assigned to Student No. 18 has been given a designated image area in the displayed pattern, and the data corresponding to Student No. 18 has been fed into the microcomputer.

A switching device according to which the information stored in the microcomputer and identified with a particular student, such as Student No. 18, can be displayed will now be described in connection with the display screen illustrated in FIG. 2. In FIG. 2, the display screen, denoted by reference letter S may advantageously be a picture display screen of a CRT. This CRT display screen S may be a touch sensitive CRT display screen of a type well known in the art, and having a switching device, as now described. On the front surface of the display screen S are mounted a plurality of horizontally extending transparent electrodes 2 and a plurality of vertical transparent electrodes 3 to form switching array 1 comprised of a plurality of switches 4. Each of the electrodes 2, 3 is in the form of a long rectangular strip, and electrodes 3 overlie the same area on the display screen S as electrodes 2. Each switch 4 consists of the area of one of the electrodes 3 where it overlies one of the electrodes 2.

The electrodes 3 are individual electrodes mounted on and at a slight distance from the display screen S, while electrodes 2 may be an electrode pattern upon the surface of the display screen S. Electrodes 3 are also slightly deformable in the direction of electrodes 2.

Each of the electrodes 3 and 2 has at one end thereof an end portion 3A, 2A. Leads 5 are connected to these end portions, respectively, and the leads 5 are further connected to a control circuit (not illustrated).

In operation, when the teacher wishes to actuate one of the switches 4, he depresses the switch 4, i.e. one portion of the electrode 3, with his finger 6. The depressed portion of this electrode 3 is deformed slightly towards electrode 2 until it comes into contact with the respective portion of the electrode 2 which it overlies. This in turn causes an electrical contact between the electrodes 2, 3 which transmits an identifying signal to the control circuit. This identifying signal is interpreted in the control circuit as the selection of this particular switch 4. For example, as illustrated in FIG. 2, the selected switch 4B is in the sixth column and the fourth row of switching array 1. Switch 4B is defined by the electrode 3B overlying and crossing electrode 2B, and the particular area of electrode 2B overlaid by electrode 3B is illustrated by the diagonal shading in electrode 2B. When switch 4B has been actuated by the depression of electrode 3B into contact with electrode 2B in the diagonally shaded area, a signal identifying the switch as that in the fourth row, sixth column is transmitted to the control circuit.

This switching array 1 of switches 4 may be used in two ways. First, each switch defines an image area on the screen which may be designated to correspond to a particular seat, by a process which will be described below. Data stored in the microcomputer relating to the seat corresponding to each image area may be identified within the microcomputer by the identifying signal created by actuation of the switch, and may be displayed on the display screen by conventional means.

Secondly, certain of the image areas, may be reserved to identify functions of the display apparatus. That is, instead of corresponding to a particular seat position within a pattern, some of these individual switches 4 may be used to identify a function of the CRT, such as putting the display apparatus into the seat management mode, or into an information display mode, or functions available within each mode, as will be described later in connection with FIG. 4. These switches will be referred to below as function keys. By this means, both image areas corresponding to seats and image areas corresponding to functions of the computer may be displayed on the display screen at the same time.

Figure 3:
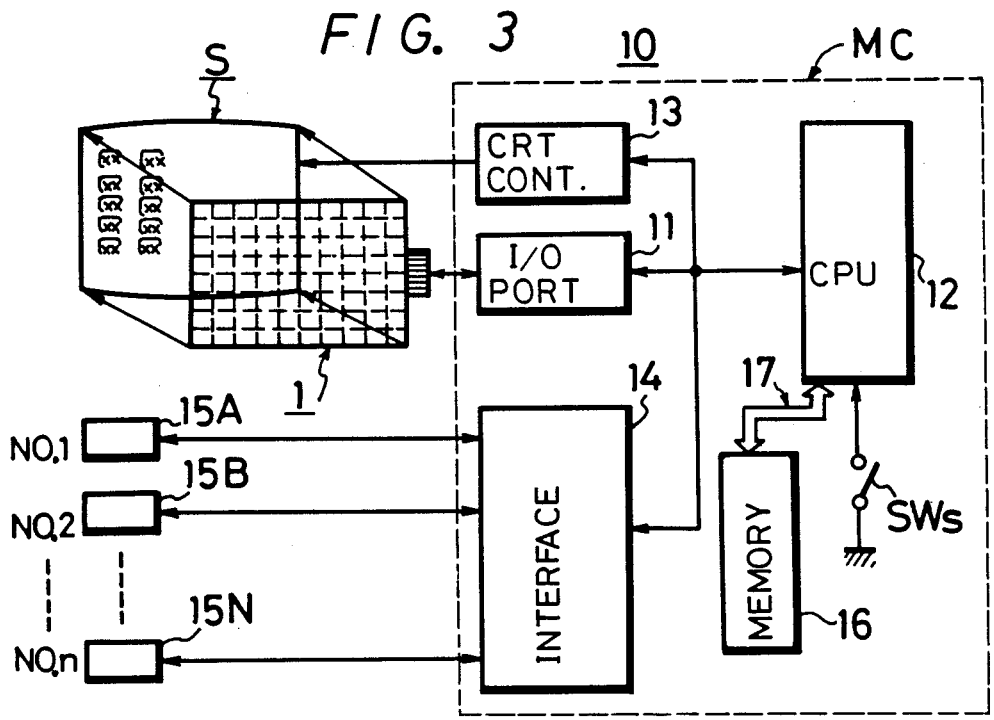
FIG. 3 is a semi-schematic block diagram showing the display screen of FIG. 2 in conjunction with an embodiment of a display apparatus according to the present invention.

An embodiment of a display apparatus according to the present invention incorporating such a touch sensitive CRT display screen will no be described with reference to FIG. 3. In FIG. 3, reference numeral 10 generally designates the arrangement of the display apparatus of the present invention, incorporating a touch sensitive CRT display screen S and switching array 1. The display apparatus 10 further includes a microcomputer MC, having an I/O port 11 for receiving the identifying signal from the selected switch 4 within the switching array 1. I/O port 11 supplies this identifying signal to a central processing unit (CPU) 12, such as the well known Z-80A microprocessor, within the microcomputer MC. CPU 12 in turn can supply data to a CRT controller 13 for controlling the corresponding display of information on display screen S. In a seat management mode of the display apparatus, i.e. the mode where the image areas are designated to correspond to the seats, as will be discussed below, this data will commonly correspond to an identifying symbol to be displayed on the display screen in the image area of the particular switch selected. The data may alternatively cause the display of an identifiable indicator at a position identified by the operation of one of several function keys. In the information display mode of the apparatus, the data from CPU 12 will cause the display of information corresponding to the image area identified by operation of the actuated switch. This data may be stored in and read out from a memory 16 within microcomputer MC through a data bus 17.

Also within the console is an interface 14 for interfacing the console with a plurality of terminals 15A to 15N, provided in the classroom for individual student use. Information input at these terminals 15A–15N by the students will be transferred through the interface 14 to CPU 12, which in turn transmits data to CRT controller 13 for the display of information corresponding to the operations of the terminals 15A to 15N. It will of course be understood that interface 14 is adapted to identify which of the terminals 15A to 15N is transmitting information, and such identification is also transmitted to CPU 12 for proper handling of the data.

When the console is initially turned on, the display apparatus 10 automatically goes into a main program mode, from which it may enter different operational modes, as desired. As indicated above, one such operational mode is the seat arrangement mode, where image areas are designated and identifying symbols are assigned. To allow entry into this mode, one of the function keys, i.e. one of the image areas reserved for functions, identifies this entry function during the main program mode. Actuation of this function key (not illustrated) causes the display apparatus to leave the main program mode and enter the seat management mode in which a corresponding switch $SW_S$ in CPU 12 is turned ON. During the seat management mode, the entry function key is not displayed. Individual image areas of the display screen may then be designated, and may be assigned identifying symbols and other information, which may subsequently be displayed on the display screen when the display apparatus is in the information display mode. When the switch $SW_S$ has been turned on, and the display apparatus 10 is in the seat management mode, display screen S will appear as in FIG. 4, and the operation of the display apparatus of the present invention in designating the individual seats according to a desired pattern will no be discussed in connection with FIGS. 4 and 5.

Figure 4:
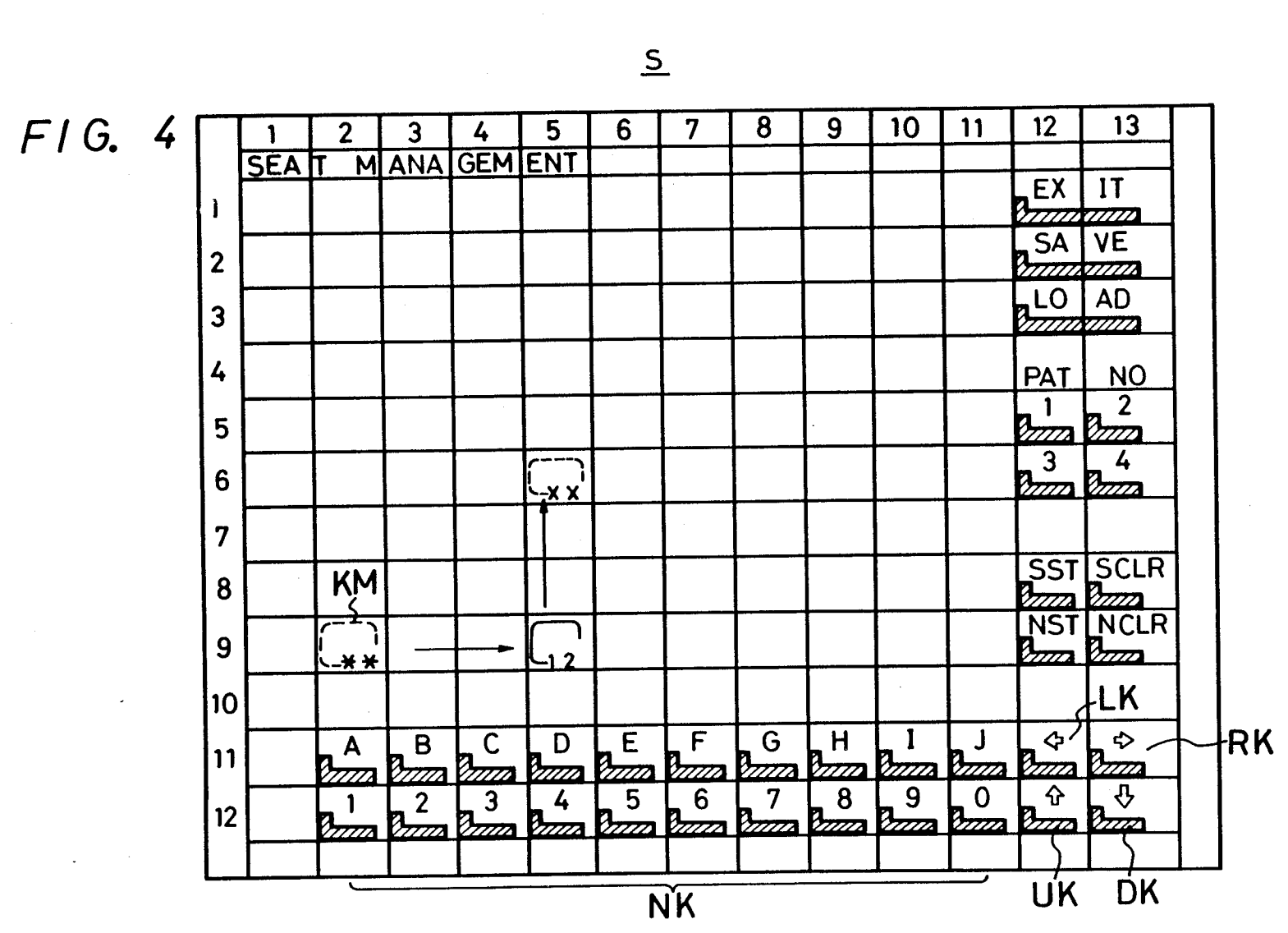

In the particular embodiment of display screen S illustrated in FIG. 4, a portion of the screen S corresponding to the first ten columns and ten rows of the illustrated array has been reserved for designatable image areas on the screens. In accordance with a desired pattern, some or all of these designatable image areas may be individually designated as corresponding to one of the seat positions assignable for student use. Also displayed on a
portion of display screens within the 12th and 13th columns and the 11th and 12th rows are function keys, whose operations control the designation of the designatable image areas.

In order to readily identify which of the designatable image areas is being considered for designation, when the display apparatus enters the seat arrangement mode a visually identifiable mark, advantageously a cursor KM, is automatically displayed in an initial one of the designatable image areas. Cursor KM may be moved to select a particular one of the designatable image areas at a time by means of cursor keys LK, RK, UK, and DK, illustrated in the lower right hand corner of the display screen S. Actuation of cursor key LK, for example, will move cursor KM one image area to the left, as indicated by the arrow displayed in the cursor key LK area. Similarly, actuation of cursor key RK will move cursor KM one image area to the right, actuation of cursor key UK will move cursor KM one image area upwardly, and actuation of cursor key DK will move cursor KM one image area downwardly. By selected and repeated application of these keys, cursor KM may be moved to appear within, and thereby to select, any desired one of the designatable image areas. For example, in FIG. 4 it is shown that cursor KM originally appears in column 2, row 9, but it may be moved to column 5, row 9 by three actuations of cursor key RK, and then further moved to column 5, row 6 by three actuations of cursor key UK. Operation of these four cursor keys is readily understandable.

Since frequently not all of the designatable areas will be designated as assigned for student use, the selection of one of the image areas by the display of cursor KM within the image area will not serve to designate that image area. Instead, when cursor KM has been moved to select an image area which is to be designated, the image area is designated by the actuation of a function key SST, appearing in column 12, row 8. Actuation of function key SST while cursor KM appears in a designatable image area operates to designate that image area.

Conversely, after an image area has been designated, if it is desired to clear the designation, for instance if an image area was designated by mistake during the seat management mode, or if the student previously assigned to the seat corresponding to the designated image area is no longer in the class, a function key SCLR is provided in the 8th row, 13th column to clear the designation.

Once a image area has been designated, it is possible to provide an identifying mark or symbol for display in the designated image area. For instance, this symbol might be the initials of the student seated in the corresponding seat position, or might be some other mnemonic label. To this end, a plurality of number keys NK with identifying letters A through J and numerals 1 through 0, for example, are provided in the function portion in rows 11 and 12, columns 1-11. To associate the entered symbols with the designated area, function key NST, located in the 12th column, 9th row, is provided. In the embodiment illustrated, two symbols selected from the letters A to J and numerals 1 to 0 are entered by actuating the corresponding number keys NK. These two symbols will then appear at the positions indicated by the asterisk marks in the cursor KM in FIG. 4. When function key NST is actuated, the entered letters or numbers are associated with the designated image area. Analagous to function key SCLR is function key NCLR, which, upon actuation, serves to clear the symbol from the designated image area.

Also displayed in the function portion of the display screen are function keys LOAD, SAVE and EXIT. Function key LOAD operates to cause the display of the immediately previously designated image area on the picture display screen S. For instance, if this image area has an incorrect identifying symbol, cursor KM can be returned to this image area by the single actuation of function key LOAD, without the repeated actuations of function keys RK, LK, UK and DK.

Function key SAVE is actuated when all the images that should be designated have been designated. This causes the data associated with the designated image areas, particularly the identifying symbols associated with the designated image areas to be stored, advantageously in an external memory device such as a floppy disc, or in an internal memory device such as random access memory 16 (FIG. 3) within microcomputer MC. The data is stored within the memory device in accordance with the position of the respective image area within the array.

Actuation of function key EXIT causes the display apparatus 10 to return from the seat management mode to the main program mode, so that the display apparatus 10 may be subsequently used in any one of the normal modes.

Also in the function portion of screen S are four function keys PATNO 1, 2, 3 and 4, respectively. The purpose of these keys is to select one of four predetermined patterns so that the symbols identifying particular students and seat areas are associated with the image areas on the screen according to the selected pattern. The operation of these function keys will now be described.

As had been discussed with reference to FIG. 4, a portion of the display screen S is divided into an array of designatable image areas, each image area having a physical location on the display screen indicated by the row and column number within the array, which may be considered a position number. The physical location of a designated image area within the array desirably reflects the physical position of the corresponding seat within the classroom. Thus, the image area in the 10th row, 1st column would correspond to the seat in the near lefthand corner of the classroom, as viewed by the teacher in front of the class. Similarly, the image area in the 1st row, 1st column would correspond to the seat in the far lefthand corner.

Figure 6A:
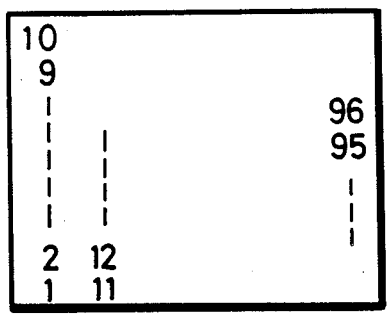
FIGS. 6A to 6D are illustrative diagrams of four possible predetermined patterns of seat or image areas.

The operation of function keys PATNO 1-4 will be described with reference to FIGS. 6A to 6D. Once the image areas have been designated and each assigned a symbol, it may happen that the actual seating arrangement within the classroom may be changed, for example, the seating positions as indicated in FIG. 6A may be switched to those shown in FIG. 6B. In that case, the first ten seats would no longer form a column, but rather would form a row. Similarly, the arrangement of FIG. 6C may be switched to that of FIG. 6D. It should be remembered that associated with each student is a variety of information stored in the memory device in accordance with the position of the respective image area within the array. This information as stored may be termed position data. In going from the arrangement illustrated in FIG. 6C to the arrangement illustrated in FIG. 6D, the students and the information relating to them have not changed, but rather the students' position within the seating arrangement has changed. The only difference this reordering should make in the display on display screen S is the particular image area with which this information, which includes the identifying symbol, should be associated. Obviously, it would be time consuming, even with the advantageous apparatus of the present invention, if all the designated seats had to be cleared and the information reinputted, when the information itself hasn't changed, but only the image area it relates to. Therefore, it would be highly advantageous to provide a single function key for causing this rearrangement, where the information and data relating to each individual student is retained unchanged, but the information is associated with different ones of the designatable image areas according to the selected pattern. Function keys PATNO 1-4 provide this function.

Figure 6B:
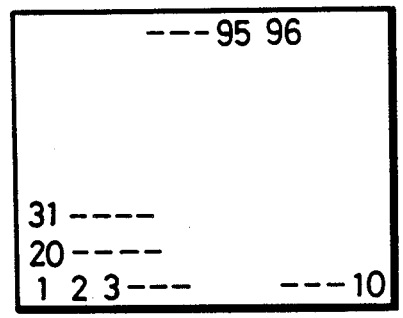

In FIGS. 6A and 6B the numbers shown may be considered to be identifying marks or symbols associated with the respective image areas. Alternatively, FIG. 6A and 6B may be used to illustrate the operation of function keys PATNO 1 to 4, by identifying the pattern number of the image areas within each pattern.

Figure 6C:
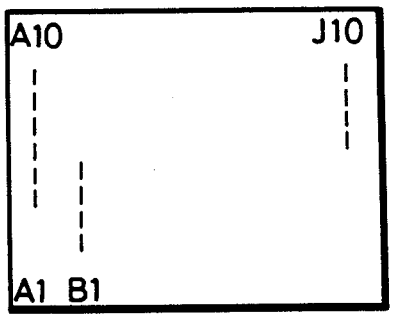
Figure 6D:
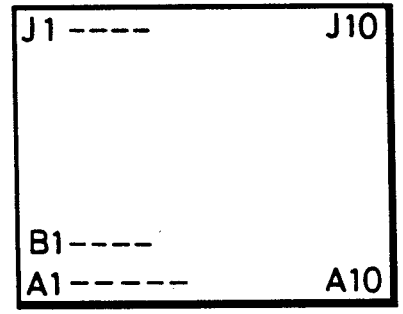

Thus, for instance, suppose that pattern number 1 is the pattern that appears in FIG. 6C. It should be understood that the symbols appearing in 6C are the identifying symbols that have been assigned to the various image areas. In this first pattern, the symbol A10 has been assigned to the image area in column 1, row 1 of the physical display screen. Also, within the memory 16 of the microcomputer MC, or in another accessible memory device, there has been stored data relating to the student assigned to this seat. The symbol A10 thus connects the student seated in the far left corner of the room with the image area in the upper left hand corner of the display screen. Similarly, the symbol A1 has been associated with the image area in column 1, row 10, and serves to identify the student seated in the near left corner of the classroom. Also associated with this student in the memory of the display apparatus is data corresponding to his attendance, etc. Suppose now that the students are rearranged within the classroom so that the student in the near left corner remains where he is but the student in the far left corner is moved to the near right corner, as in the pattern shown in FIG. 6D. Suppose also that pattern 2 is a pattern such as shown in FIG. 6D. That is, the seats, which had received numbers within the first pattern as shown in FIG. 6A, now receive numbers within the second pattern as shown in FIG. 6B. Clearly, the set of numbers assigned to the seats is the same in all patterns, but the arrangement of the numbers within the pattern is different. Operation of function key PATNO 2 will automatically cause the redistribution of the symbols and data according to the new pattern. The symbol and data which refer to a particular student are always associated with the same pattern number, but the physical position of the image area identified by this pattern number is changed. Therefore, the data is always stored in accordance with physical position of the image area in the array, but the physical position will vary depending on the pattern selected.

Figure 5:
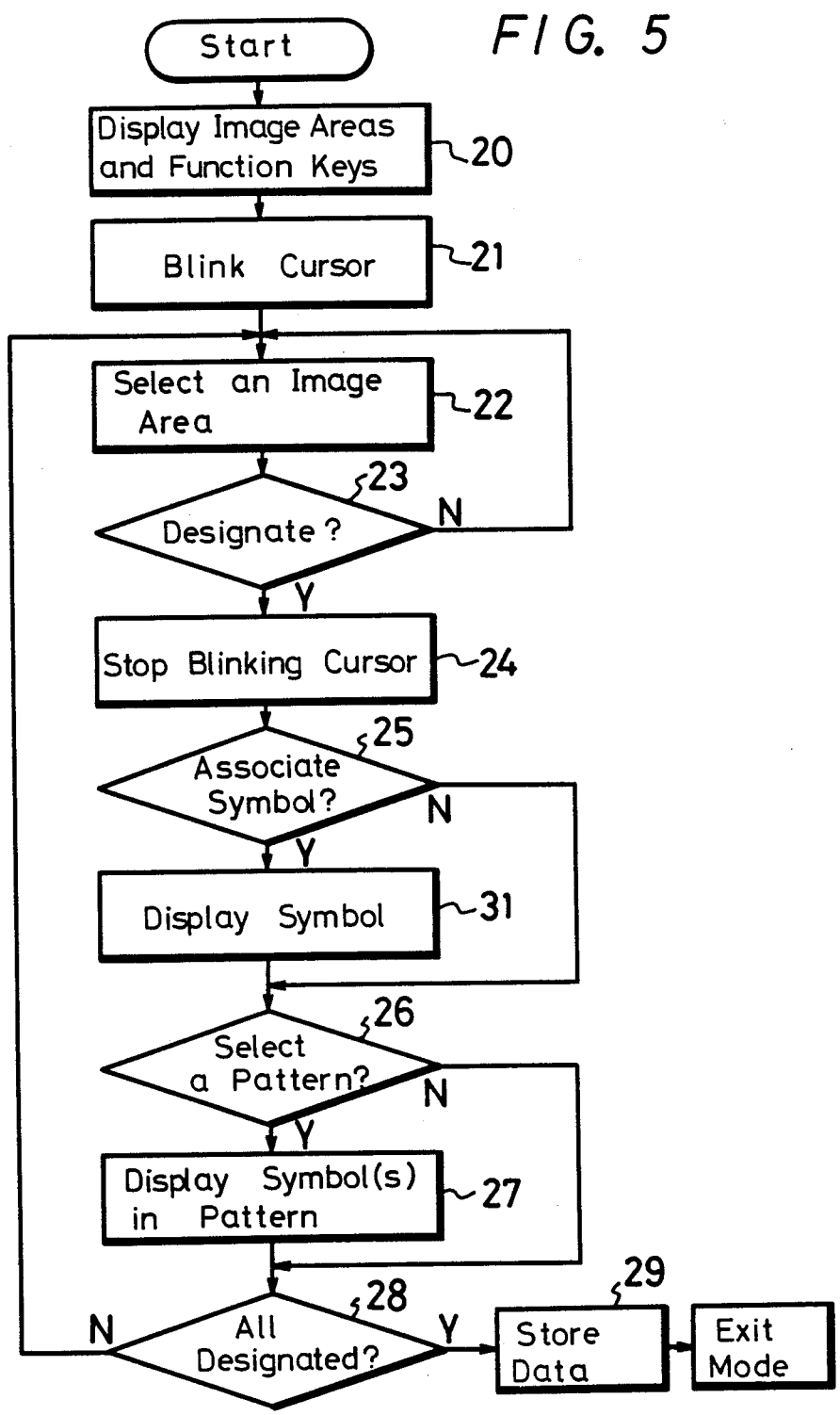
FIG. 5 is a flow chart of a designating process employed in an apparatus according to the present invention.

The normal method of designating and identifying the image areas on the display screen by operation of the function keys will now be described with reference to the flow chart in FIG. 5.

When the switch SW$_S$ (FIG. 3) is turned on, the display apparatus 10 is placed in the seat management mode. In step 20 of FIG. 5, the image areas and the function keys are displayed on the display screen S so that it appears as shown in FIG. 4. That is, the switching array 1 of designatable image areas, which in this embodiment are the areas included in columns 1 to 10 and rows 1 to 10, is displayed, and in the function portion of the display screen S the various function keys with their identifying labels are also displayed. This operation is an automatic function of the display apparatus once the switch SW$_S$ has been turned on. In step 21, which is also an automatic function of the display apparatus, cursor KM is blinked to indicate that the seat designation procedure may be followed. In step 22, cursor KM may be moved by steps to select the first desired image area for designation. With each step movement of cursor KM, the apparatus checks, in step 23, to determine whether function key SST has been actuated to cause the designation of the image area where the cursor KM then appears. If this has not happened the display apparatus returns to step 22 for the next step movement of the cursor KM.

Once function key SST has been actuated, the image area is designated within CPU 12, and cursor KM stops blinking to indicate that the image area has been designated, in step 24. Subsequently, the number keys NK labeled respectively with the letters A to J or numerals 1 to 0 may be actuated to select symbols to be displayed at the asterisk marks of cursor KM. In step 25, the apparatus determines whether such number keys NK have been actuated. If so, in step 31, the symbols are displayed in the image area. In any case, the display apparatus then proceeds to step 26, where it determines whether or not one of the patterns according to function keys PATNO 1 to 4 has been selected. If a pattern has been selected, the symbol is then displayed in the image area according to the selected pattern in step 27. In step 28, the display apparatus 10 checks to see whether function key SAVE has been actuated. If it has, data, including data corresponding to the identifying symbols associated with the particular image areas, are stored in the external or internal storage means or memory 16. If function key SAVE has not been actuated, the program returns to step 22 for the designation of additional image areas.

Therefore, the present invention provides display apparatus for a group education system where a displayed pattern of symbols on the display screen accurately corresponds to the actual seating arrangement of students within the classroom, and further where the displayed pattern may be readily created or adapted as the seats are set up or rearranged. Thus, when the display apparatus is initially installed within a classroom, the desired image areas may be designated so that the displayed pattern corresponds to the seat arrangement of the terminals. Then, as the students are assigned to seat positions, identifying symbols and information relating to the individual student may be assigned and stored in accordance with these image areas on the screen. It is therefore very easy to recall this information from storage and to display it by actuating the corresponding switch overlying the selected image area. If the number of students should change, or the display apparatus is used for a variety of classes, with different students, the image areas may be easily redesignated to correspond to the new seating arrangement, simply by turning on switch SW$_S$, and operating the function keys in the manner described above. Therefore, as compared with previously proposed display apparatus, the display apparatus of the present invention may be used with ease and facility and may easily be adapted for each class.

Furthermore, the seat display may be arbitrarily arranged in accordance with the particular classroom it is installed in, since the displayed pattern may be adapted within the seat management mode to correspond to any seating arrangement. Thus, neither the seating arrangement nor the display apparatus need conform to one particular arrangement. Therefore, the display apparatus may be mass produced.

Although a preferred embodiment of the present invention has been described in detail herein with reference to the accompanying drawings, it is to be understood that the invention is not limited to this precise embodiment, and that various changes and modifications may be effected therein by one skilled in the art without departing from the scope and spirit of the invention as defined in the appended claims.

I claim:

1. A display apparatus for a group education system having a plurality of physically ordered seat positions assignable for student use, comprising:

a display screen having a portion divided into a plurality of designatable image areas;

selection means for selecting said designatable image areas one at a time and displaying a visually identifiable indicator in said selected one of said designatable image areas;

means for designating said one selected image area as an image area assigned for student use to correspond to one of said seat positions, said designated image area having a position on said display screen in accordance with the physical ordering of said one of said seat positions;

means for identifying each said designated image area by associating therewith a selected one of a plurality of identifying marks;

storage means for storing position data corresponding to the designated image areas and the identifying marks respectively associated therewith;

control means for causing said display screen to selectively display, in said designated image areas, the identifying marks associated therewith in response to the stored position data; and a unitary control member actuable for reassigning said stored position data corresponding to said designated image areas and the identifying marks associated therewith to respective ones of said image area as new designated image areas having respective positions on said display screen in accordance with a physical reordering of said seat positions so that said control means causes said display screen to selectively display the identifying marks in the new designated image areas associated therewith in response to the reassigned stored position data without reentry of position data in said storage means.

2. A display apparatus according to claim 1, wherein said designatable image area form a physical array having M rows and N columns, each said designatable image area has associated with it a position number corresponding to its physical position within said array, and said position data is stored in said storage means in accordance with the position number of each designated image area.

3. A display apparatus according to claim 2, wherein said physical array of image areas has further associated with it a set of pattern numbers which respectively identify different ones of said image areas according to one of a plurality of patterns; and said device further comprises pattern selecting means for associating a selected one of said patterns with said ordered array such that the position data corresponding to each designated image area is further associated with the pattern number identifying this designated image area according to the selected pattern.

4. A display apparatus according to claim 3, wherein said pattern selecting means is operative when changing said selected pattern to change the position numbers with which the position data is associated while maintaining the association of the position data with the pattern numbers, so that said identifying marks are displayed in the image areas identified according to the selected pattern.

5. A display apparatus according to claim 1, wherein said plurality of designating marks constitute an ordered sequence of symbols for identifying said designated image areas in an ordered sequence of image areas.

6. A display apparatus according to claim 1, wherein said visually identifiable indicator is a seat designating cursor displayed within one of said designatable areas, and said selection means includes means for moving said seat designating cursor to be displayed in said selected one of said designatable areas.

7. A display apparatus according to claim 1, further comprising a central processing unit incorporating said storage means, a plurality of terminals corresponding to said plurality of seat positions and adapted to receive information input at the respective seat positions, and interface means for transmitting said information input at said terminals to said central processing unit.

8. A display apparatus according to claim 1, wherein a further portion of said display screen is divided into a plurality of function areas for identifying respective functions of said display apparatus; and said display apparatus further includes a plurality of manually actuable switch means overlying respective ones of said function areas on said display screen, wherein manual actuation of one of said switch means causes operation of said respective function.

9. A display apparatus according to claim 8, wherein said functions include:

selecting one of said designatable image areas,
designating one of said designatable image areas,
identifying one of said image areas,
storing said position data, and
displaying images corresponding to said position data.

10. A display apparatus according to claim 9, wherein said selection means includes the switch means overlying the function area identifying the function of selecting one of said designatable image areas.

11. A display apparatus according to claim 1, said display apparatus being operable in an information display mode, wherein said display apparatus further includes a plurality of manually actuable switch means overlying respective ones of said designatable image areas on said display screen, wherein manual actuation of one of said switch means causes the display of information associated with the respective image area.

12. A method for displaying on a display screen of a console information corresponding to a plurality of physically ordered seat positions assignable for student use in a group education system, where the display screen has a portion thereof divided into a plurality of designatable image areas adapted, upon designation, to correspond to the seat positions actually assigned for student use, the method comprising the steps of:

selecting said designatable image areas one at a time;

displaying a visually identifiable indicator in said selected one of said desiginatable image areas;

designating said one selected image area as an image area assigned for student use to correspond to one of said seat positions in actual use, said designated image area having a position on said display screen in accordance with the physical ordering of said one of said seat positions;

identifying each said designated image area by associating therewith a selected one of a plurality of identifying marks;

storing position data corresponding to the designated image area and the identifying mark respectively associated therewith;

causing said display screen to selectively display, in said designated areas, the identifying marks associated therewith in response to the stored positions data; and upon a subsequent physical reordering of the seat positions actually assigned for student use, reassigning by unitary actuation said stored position data corresponding to the designated image area and the identifying marks respectively associated therewith to respective ones of said image areas as new designated image areas having respective positions on said display screen in accordance with said physical reordering of said seat positions so that said display screen selectively displays the identifying marks in the new designated image areas associated therewith in response to the reassigned stored position data without restoring of position data.

13. A method for displaying on a display screen of a console information corresponding to a plurality of physically ordered seat positions assignable for student use in a group education system, the display screen having a portion divided into a plurality of designatable image areas adapted upon designation to correspond to the seat positions actually assigned for student use, comprising the steps of:

displaying said image areas on said portion of said display screen;

displaying in an initial one of said image areas an identifying cursor mark:

moving said cursor mark to a selected one of said designatable image areas;

designating said selected image area as a designated image area, said designated image area having a position on said display screen in accordance with the physical ordering of a corresponding seat position;

indicating that said selected area has been designated;

associating an identifying symbol with said designated image area;

displaying said associated identifying symbol in said designated image area;

repeating the steps of moving said cursor mark and the subsequent steps until all image areas desired to be designated have been designated;

storing position data corresponding to the designated image areas and the identifying marks respectively associated therewith;

causing said display screen to selectively display, in said designated image areas, the identifying marks associated therewith in response to the stored position data;

upon a subsequent physical reordering of the seat positions actually assigned for student use, reassigning by unitary actuation said stored position data corresponding to the designated image areas and the identifying marks respectively associated therewith to respective ones of said image areas as new designated image areas having respective positions on said display screen in accordance with said display screen selectively displays the identifying marks in physical reordering of said seat positions so that said display screen selectively displays the identifying marks in the new designated image area associated therewith in response to the reassigned stored position data without restoring of position data.

14. A method according to claim 13, further comprising, after said step of displaying said associated identifying symbol in said designated image area, the steps of associating with said designatable image areas a set of pattern seat numbers which respectively identify different ones of said image areas according to one of a plurality of patterns; and associating a selected one of said patterns with said designatable image areas such that the position data corresponding to each designated image area is further associated with the pattern number identifying this designated image area according to the selected pattern.

15. A method according to claim 14, wherein said step of associating a selected one of said patterns with said designatable image areas includes the step of associating position data formerly corresponding to each image area having a pattern number with a different image area having the same pattern number in the selected pattern.

16. A method according to claim 14, further comprising, after the step of associating a selected one of said patterns with said designatable image areas, the step of displaying said information symbols in image areas corresponding to the selected pattern.

* * * * *

UNITED STATES PATENT AND TRADEMARK OFFICE
CERTIFICATE OF CORRECTION

PATENT NO. : 4,963,097
DATED : October 16, 1990
INVENTOR(S) : Shinji Anju

It is certified that error appears in the above-indentified patent and that said Letters Patent is hereby corrected as shown below:

```
On the title page, in the Abstract, line 12, change "on" to --one--
      line 14, change "made" to --mode--
Col. 5, line 46, change "no" to --now--
Col. 11, line 43, change "area" to --areas--
Col. 13, line 14, change "area" to --areas--
Col. 14, line 19 & 20, delete "display screen selectively displays the
      indentifying marks in"
          line 22, change "area" to --areas--
```

Signed and Sealed this

Thirteenth Day of September, 1994

Attest:

BRUCE LEHMAN

*Attesting Officer*   *Commissioner of Patents and Trademarks*